Sept. 9, 1958 F. A. VITHA ET AL 2,851,529

MONITORING DEVICE IN CARRIER-WAVE TELEPHONE TRANSMISSIONS

Filed Jan. 14, 1955 2 Sheets-Sheet 1

INVENTORS
Franz Anton Vitha
Charles Ziekman
BY Fred M. Vogel
Agent

INVENTORS
FRANZ ANTON VITHA
CHARLES ZIEKMAN
BY Fred M. Vogel
AGENT

United States Patent Office 2,851,529

Patented Sept. 9, 1958

2,851,529

MONITORING DEVICE IN CARRIER-WAVE TELEPHONE TRANSMISSIONS

Franz Anton Vitha and Charles Ziekman, Hilversum, Netherlands, assignors, by mesne assignments, to North American Philips Company, Inc., New York, N. Y., a corporation of Delaware Application January 14, 1955, Serial No. 481,944

Claims priority, application Netherlands February 9, 1954

7 Claims. (Cl. 179—2.5)

Figure 1:
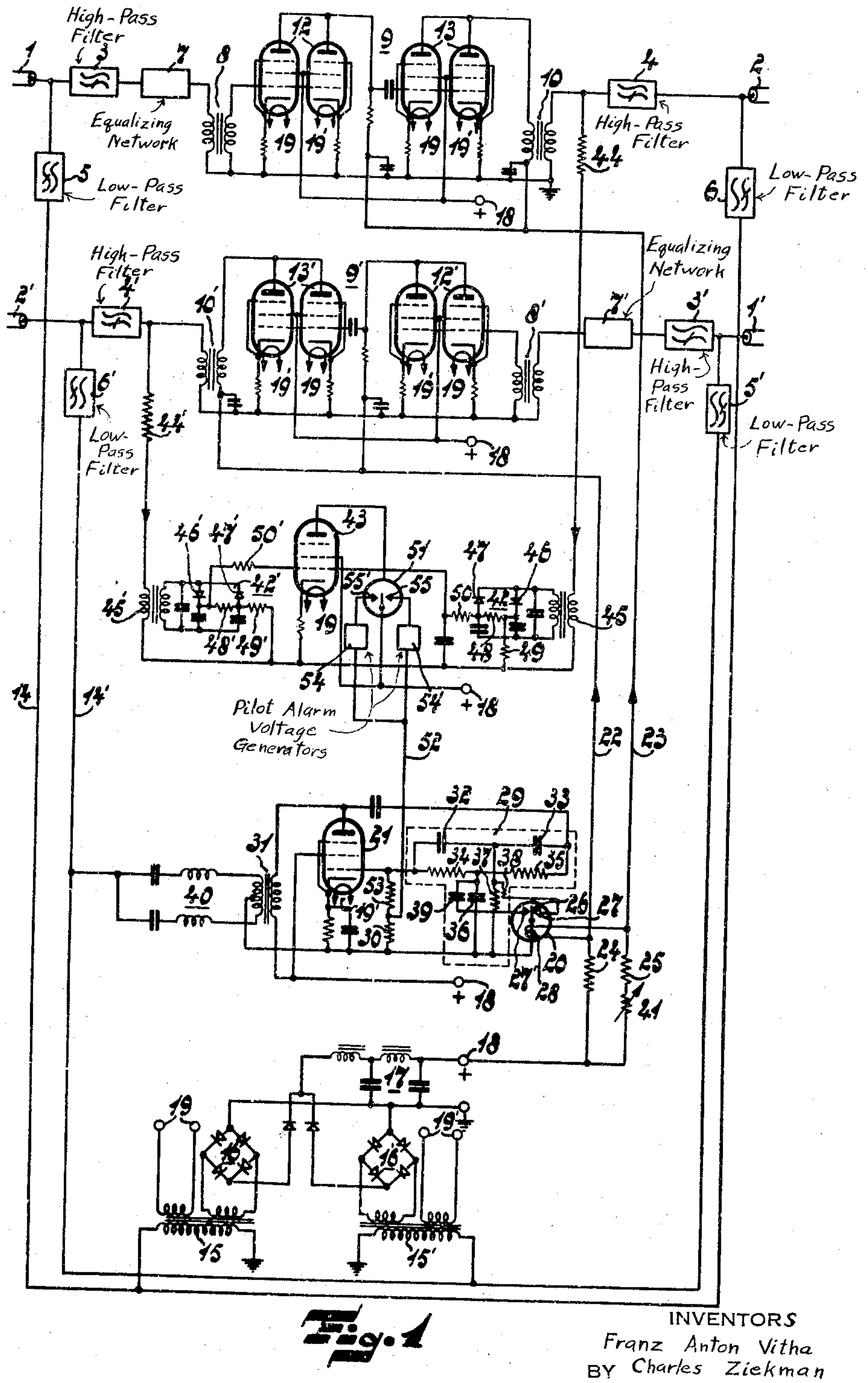

The invention relates to a monitoring device for use in a carrier-wave telephone system for the supervision, more particularly the remote supervision, of amplifiers used in a repeater station for the outgoing and the incoming traffic respectively. In carrier-wave telephone systems the use of such monitoring devices has particular advantages, since this permits the immediate indication of a deviation from the normal operation conditions in a repeater station and allows obviating the cause in an early stage. The possibility of disturbances of the transmission, for example due to the break-down of a repeater station, is thus minimized.

Such monitoring devices are of particular importance for carrier-wave telephone systems, in which the transmission path includes one or more repeater stations without control, as is for example frequently the case with carrier-wave telephone communications via coaxial conductors, cables and the like. It is advantageous to transmit the signals from monitoring devices associated with different repeater stations referred to hereinafter as measuring signals to a terminal station, so that at a central point a supervision of the operational conditions of the entire carrier-wave telephone system may be realized. In this case the measuring signals may be transmitted via the carrier-wave cable itself, via separate wire pairs or in a different way.

The invention has for its object to provide a monitoring device in a carrier-wave system of the kind referred to above, in which one or more of the following requirements may be met simultaneously:

(1) A variation in anode current beyond a given limit or the break-down of an amplifying tube must be indicated by the monitoring device, which, if desired, has to actuate an alarm device in a terminal station.

(2) If the measuring signals are transmitted via the carrier-wave telephone cable, these measuring signals and the further signals transmitted via this cable, for example speech signals, dialling signals and the like must not affect one another.

(3) The transmission of the measuring signals is preferably based on the rest-current principle in order to obtain an indication of disturbance or, as the case may be, break-down of the monitoring device.

(4) Measuring signals received from different repeater stations must be distinguishable.

(5) The monitoring device must be capable of indicating inadmissible differences between the signal levels for the incoming and the outgoing traffic and of actuating an alarm device.

(6) The monitoring devices must furthermore be capable of indicating disturbances of the supply in the repeater stations.

The monitoring device according to the invention comprises a measuring oscillator, the tuning frequency of which is discontinuously adjustable by means of a relay circuit, which includes an energizing circuit, which provides a differential connection in the anode circuits of tubes associated with different amplifiers, whilst the measuring frequencies derived from the oscillator govern a frequency oscillator which may be in a different station.

The invention and its advantages will be described with reference to the figures in the drawing.

Figure 2:
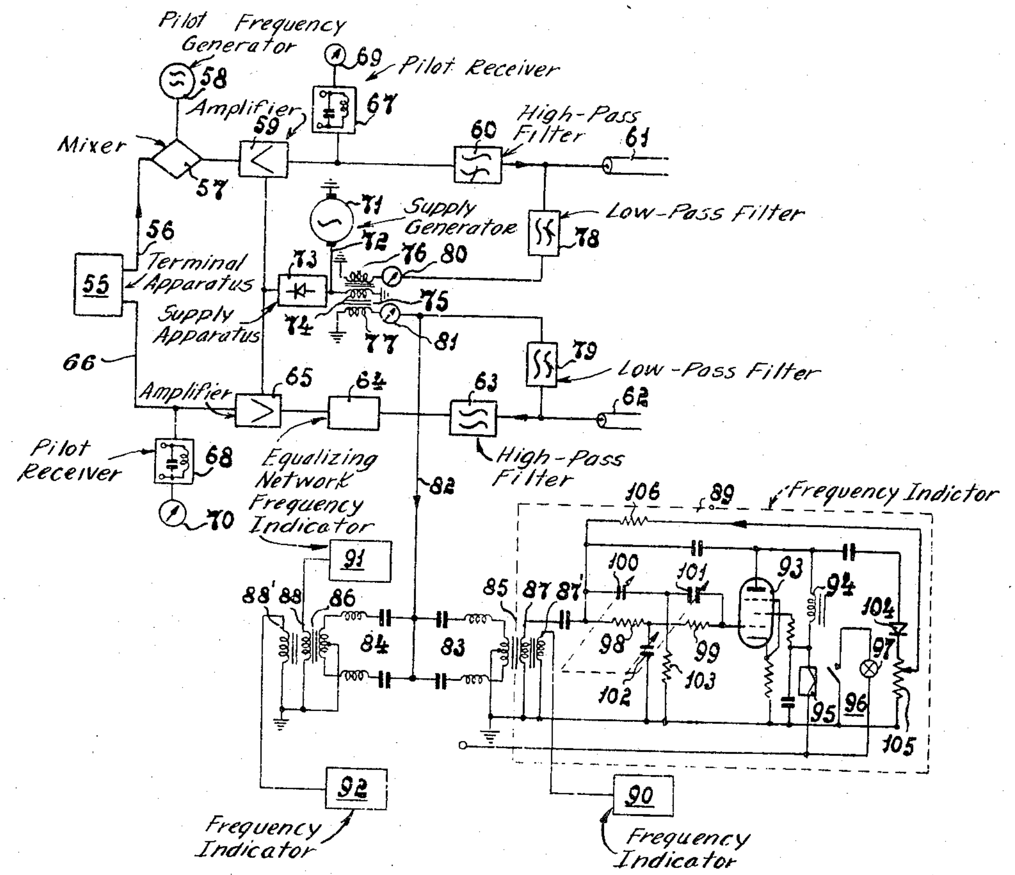

Fig. 1 shows a repeater station lying between terminal stations of a carrier-wave telephone system and provided with a monitoring device according to the invention and Fig. 2 shows a terminal station comprising a frequency indicator co-operating with the monitoring device.

The repeater station and the terminal station shown in Figs. 1 and 2 respectively form part of a carrier-wave telephone system, in which the speech signals, the pilot signals, the supply voltages, the measuring signals, service communcations and the like are transmitted through one coaxial cable. For these signals the following frequency bands may for example be reserved: 960 speech channels 60 kc./s. to 4 mc./s. with pilot signals having in this case for example a frequency of 60 kc./s., service communications from 15 to 21 kc./s., measuring signals from 6 to 12 kc./s., supply voltage of 50 c./s.

The repeater station shown in Fig. 1 is suitable for outgoing and incoming traffic; the cables 2' and 2 serve for the outgoing traffic and the cables 1' and 1 are used for the incoming traffic. To each end of the cables 1, 2 and 1', 2' at the repeater station is connected, for frequency separation of the transmitted signals, the parallel combination of high-pass filters 3, 4 and 3', 4' respectively and low-pass filters 5, 6 and 5', 6' respectively. The high-pass filters 3, 4 and 3', 4' respectively pass only the speech signals and the pilot signals, whereas the low-pass filters 5, 6 and 5', 6' respectively pass only the service communications, the measuring signals and the supply voltages.

The signals selected by the high-pass filters 3 and 3' from the cables 1 and 1' respectively are supplied through equalization networks 7 and 7' respectively and input transformers 8 and 8' respectively to amplifiers 9 and 9' respectively, which are connected via output transformers 10 and 10' respectively and the high-pass filters 4 and 4' respectively to the coaxial cables 2 and 2' respectively. The amplifiers 9 and 9' are constituted by two cascade-connected stages 12, 13 and 12', 13' respectively, which comprise each two parallel-connected pentodes negatively fed back by cathode impedances.

The connection between the cables 1 and 2, 1' and 2' respectively for the further signals, i. e. the service communications, the measuring signals and the supply voltages, is constituted by the low-pass filters 5, 6 and 5', 6' respectively and the conductors 14 and 14' respectively provided between these filters.

In the embodiment shown the conductors 14 and 14' convey voltages in phase-opposition, having the mains frequency, these voltages constituting the supply voltages for the supply apparatus of the repeater station. The supply apparatus comprises two transformers 15 and 15' connected to the conductors 14 and 14' respectively, the secondary windings of these transformers being connected to rectifying circuits 16 and 16' respectively, which are connected in parallel with the input of a smoothing filter 17. From the output terminal 18 of the smoothing filter 17 is obtained a positive direct voltage, which supplies the anode voltages and screen-grid voltages for the amplifying tubes in the repeater stations; the filament voltages for the amplifying tubes are obtained from the secondary windings 19 and 19' respectively.

As is shown in the figure, the winding 19 supplies the filament voltage for one of the amplifying tubes in each of the amplifying stages 12, 13 and 12', 13' respectively, whilst the filament voltage for the further amplifying tubes in these amplifying stages is obtained from the winding 19'. Thus, upon a break-down of one of the supply voltages across the conductors 14 and 14', the amplifying stages 12, 13 and 12′, 13′ respectively nevertheless continue to operate.

The repeater station comprises a device for the remote control, for example from a terminal station, of the amplifying stages for outgoing and incoming traffic 12, 13 and 12′, 13′ respectively.

According to the invention the monitoring device comprises a measuring oscillator 21, the tuning frequency of which is discontinuously adjustable by means of a relay circuit, which comprises an energizing circuit which is in differential connection in the anode conductors 22 and 23 of the amplifying stages 12, 13 and 12′, 13′ respectively, whilst the measuring frequencies obtained from the oscillator 21 govern a frequency indicator provided in the terminal station. In the arrangement shown the relay circuit comprises a contact voltmeter 20, having two terminal contacts 27 and 27′ and a switching contact 26, whilst the ends of the energizing winding 28 of the contact voltmeter 20 is connected via series resistors 24, 25 included in anode conductors 22 and 23 to the positive terminal 18 of the supply apparatus.

The measuring oscillator 21 is an RC-oscillator, in which the frequency-determining circuit 29, constructed in the form of a double T-network, is connected via a grid resistor 30 to the control-grid of the pentode connected as an oscillator, whilst the anode is connected through the primary winding of the output transformer 31 to the positive terminal of the anode voltage device. The double T-network comprises a series branch including two series-connected capacitors 32 and 33, which are shunted by the series-combination of two resistors 34 and 35, whilst the parallel branch of the shunted T-filter is constituted by a capacitor 36, connected to the junction of the series-connected resistors 34 and 35, and by a resistor 37, connected to the junction of the series-connected capacitors 32 and 33. To the junctions of the capacitors 32 and 33 and of the resistors 34 and 35 are connected a resistor 38 and a capacitor 39 respectively, which are connected to the terminal contacts 27 and 27′ respectively of the contact voltmeter 20.

For the remote control of the amplifying stages 12, 13 and 12′, 13′ the output transformer 31 of the measuring oscillator 21 is connected to the conductor 14′ through a bandpass filter 40, having a pass range of 6 to 12 kc./s., which thus constitutes a blocking filter for the supply voltage of 50 c./s. and the service communications lying in the frequency band from 15 to 21 kc./s. The measuring frequency from the oscillator is supplied via the conductor 14′ to the coaxial cable 1′ and 2′ respectively, to which the aforesaid frequency indicator in the terminal station is connected.

In the monitoring device the anode currents of the amplifying tubes for the outgoing and the incoming traffic 12, 13 and 12′, 13′ respectively produce across the resistors 24 and 25 voltage differences which are compared with one another in the energizing circuit 28 of the contact voltmeter 20. In normal operation the switching contact 26 lies between the terminal contacts 27 and 27′; the adjustment of the switching contact 26 into the central position is obtained by means of an adjustable resistor 41, connected in series with the resistor 25.

A variation in the anode current of the amplifying tube in the stages 12, 13 and 12′, and 13′ beyond a given limit causes the switching contact 26 to establish a connection to one of the terminal contacts 27 or 27′; in accordance with the polarity of the difference voltage between the ends of the energizing circuit of the contact voltmeter 20, the switching contact 26 establishes a connection either with the terminal contact 27 or the terminal contact 27′. Thus the resistor 38 or the capacitor 39 are included in the parallel branch of the double T-network 29, so that the oscillator frequency is increased or decreased respectively. Consequently, in the terminal station, wherein the oscillator frequency is indicated on the frequency indicator co-operating with the monitoring device, deviations beyond a given limit of the anode current of an amplifying tube can be stated immediately.

The possibilities of variations in the anode currents of two or more amplifying tubes, such that they compensate one another for the major part, is very small in practice, so that the frequency of the measuring oscillator 20 gives a distinct indication of the operational conditions of the tubes in the amplifying stages 12, 13 and 12′, 13′.

The said anode current variations are, in general, due to aging of the amplifying tubes in the amplifying stages 12, 13 and 12′, 13′. Since the aging of an amplifying tube produces an increase in anode current, the said monitoring device provides an indication whether such a tube lies in the amplifiers 12, 13 for the outgoing traffic or in the amplifiers 12′, 13′ for the incoming traffic. The aging of an amplifying tube produces opposite variations in the measuring frequency of the oscillator in the cascade 12, 13 for the outgoing traffic or in the cascade 12′, 13′ for the incoming traffic by switching on the resistor 39 or the capacitor 38 respectively.

Instead of using a contact voltmeter, use may be made of a polarized relay having a central position and two terminal contacts. As a further alternative, the relay circuit may include a relay having a plurality of energizing circuits, which are in differential connection in the anode circuits of tubes associated with the amplifiers 12, 13 and 12′, 13′.

For the supervision and, as the case may be, a control of the amplification by the amplifiers in the carrier-wave telephone system use is made of pilot signals transmitted with the intelligence signals. In the repeater station shown this supervision is realized by supplying the pilot signals obtained from the amplifiers 12, 13 and 12′, 13′ for the outgoing and the incoming traffic respectively, through rectifying circuits 42 and 42′ respectively to a difference producer 43, the output difference voltage of which, upon exceeding a threshold value, releases a normally cut-off pilot alarm voltage generator, the pilot alarm voltage producing a periodical cut-off of the measuring oscillator 21.

The pilot signals occurring across the output transformers 10 and 10′ of the amplifiers 12, 13 and 12′, 13′ respectively are supplied through series resistors 44 and 44′ to transformers 45 and 45′, comprising secondary windings tuned to the pilot frequencies and connected to the aforesaid rectifying circuits 42 and 42′. The rectifying circuits 42 and 42′ comprise two rectifying cells 46 and 47, 46′ and 47′ respectively, connected in opposite senses and having an output circuit constituted by a resistor 48 and 48′ respectively, one of the ends of which is connected to earth via a resistor 49 and 49′ respectively. To the other end of the output resistor 48 and 48′ respectively occurs a direct voltage of negative or of positive polarity, which is supplied via series resistors 50 and 50′ respectively to the control-grids of the difference producer constituted by the pentode 43, the anode circuits of which includes a contact voltmeter 51 for releasing the pilot alarm voltage generator. The output circuit of the pilot alarm voltage generator is connected through the conductor 52 to a tapping 53 of the grid resistor 30 of the measuring oscillator 21 and thus produces, upon release, a cut-off of the measuring oscillator 21.

Since relative level differences of the amplified pilot signals are, in general, due to a decrease in amplification in one of the amplifying stages, it is possible also in this case to find out the disturbed amplifier 12, 13 or 12′, 13′. To this end, in the repeater station shown two pilot alarm voltage generators 54 and 54′ are connected to different contacts 55 and 55′ respectively of the contact voltmeter 51; in accordance with the polarity of the difference voltage either one or the other pilot alarm voltage generator is released; these two pilot alarm voltage generators produce a cut-off of the measuring oscillator 21 with different periodicities, for example of 1 c./s. and 3 c./s. If in the repeater station shown for example the level of the pilot oscillations at the output of the amplifier 12, 13 decreases by 4 db, the pilot alarm voltage generator 54 is switched on and the measuring oscillator 21 is switched on and off with a periodicity of 1 c./s. In the other case the pilot alarm voltage generator is released for 3 c./s.; thus the periodicity of the cut-off of the measuring oscillator indicates the disturbed amplifiers 12, 13 or 12′, 13′. Instead of using the contact voltmeter 51 for releasing the pilot alarm voltage generators 54 and 54′, use may be made of the parallel combination of a maximum relay and a minimum relay.

The monitoring device shown also permits the indication of disturbances of the supply. To this end in the monitoring device shown the filament voltage for the pentode 43 is derived from the winding 19 of the supply apparatus, whilst the filament voltage for the measuring oscillator 21 is derived from the winding 19′. If the supply voltage across the conductor 14′ fails, the measuring oscillator 21 is switched off, whereas if the supply voltage across the conductor 14 fails, the pentode 43 is switched off, so that the pilot alarm voltage generator 54′ is released, the measuring oscillator being thus cut-off with a periodicity of 3 c./s. At the terminal station it can be determined, as will be explained hereinafter, whether we are concerned in the latter case with a pilot disturbance or a supply disturbance.

If there are more repeater stations in the transmission path, each of these stations may comprise a monitoring device of the kind described above, the measuring oscillators being tuned to different frequencies in order to distinguish the measuring signals from the various stations. For these different measuring frequencies, the frequency band from 6 to 12 kc./s. is employed.

Summarizing we may thus state that the monitoring device indicates the nature of the disturbance (variation in anode current, pilot disturbance or supply disturbance) in the disturbed repeater station, whilst, moreover, the position of the disturbance in the disturbed repeater station (amplifiers 12, 13 or 12′, 13′, supply apparatus) can be determined from the measuring signals produced.

Instead of using RC-oscillators in the said monitoring devices, use may be made of other oscillators, for example Colpitts- or Hartley-oscillators and the like.

Fig. 2 shows a terminal station of the carrier-wave telephone system, comprising four frequency indicators to indicate the measuring signals from the monitoring devices provided in four repeater stations in the transmission path.

In the terminal station shown the output signals from a terminal apparatus 55 for 960 speech channels are supplied through a conductor 56 and a mixing stage 57, comprising a pilot frequency generator 58, to an amplifier 59, the output circuit of which is connected through a high-pass filter 60 to a coaxial cable 61.

The incoming speech signals from the coaxial cable 62 are supplied to the output apparatus through a high-pass filter 63, an equalization network 64, an amplifier 65 and a conductor 66. To the outputs of the amplifiers 59 and 65 are connected pilot receivers to check the level of the pilot signals, each of the pilot receivers being constituted by the cascade connection of a circuit tuned to the pilot frequencies 67 and 68 respectively and an indicating instruments 69 and 70 respectively.

The supply voltages for the carrier-wave system are supplied from a generator 71, having a frequency of 50 c./s., and being connected via a conductor 72 to the supply apparatus 73 of the terminal station and to the primary winding 74 of a transformer 75, having two secondary windings 76 and 77, which are connected via low-pass filters 78 and 79 respectively, to the coaxial cables 61 and 62. Indicating instruments 80 and 81 are included, in series with each of the secondary windings 76 and 77 to check the load of the repeater stations in the coaxial cables.

In the terminal station shown the incoming measuring signals from the coaxial cable 62 are supplied via the low-pass filter 79 and a conductor 82 to two identical band-pass filters 83 and 84, connected in parallel with the conductor 82, the output circuits of these filters including transformers 85, and 86 respectively, having two secondary windings 87, 87′ and 88, 88′ respectively. The band-pass filters 83, 84 have a pass range of 6 to 12 kc./s. and thus behave as blocking filters for the supply voltages of 50 c./s.

To the secondary windings 87, 87′ and 88, 88′ of the transformers are connected the frequency indicators 89, 90, 91 and 92, which are adjusted to the frequency of a measuring signal produced by the monitoring device in a given repeater station; the frequency indicators 89, 90, 91 and 92 may, for example be adjusted to the frequencies of 7, 9, 8 and 10 kc./s.

The frequency indicators 89, 90, 91 and 92 are constructed in an identical manner, the figure shows only the detail diagram of the frequency indicator 89, which will now be described more fully.

In this frequency indicator the measuring frequencies obtained from the secondary winding 87 of the transformer 85 are supplied to the control-grid of a pentode 93, connected as an amplifier, which is fed back negatively by a non-shunted cathode resistor and the anode circuit of which includes the series combination of an inductor 94 and a relay 95, which governs an alarm device 96, comprising an alarm signal device 97. Between the anode and the control-grid of the pentode provision is made of a frequency-dependent negative feed-back network, constructed as a double T-network, comprising a series branch having two series-connected resistors 98 and 99, which are shunted by the series combination of two capacitors 100 and 101, whilst the parallel branch is constituted by the capacitor 102 or the resistor 103 connected to the junctions of the series-connected resistors 98, 99 or capacitors 100 and 101 respectively. The negative feed-back circuit is proportioned to be such that it supplies only a negative feed-back voltage for frequencies lying beyond the frequencies produced by the measuring oscillator in the normal operational conditions.

In the frequency indicator shown a rectifier 104, having an output resistor 105, is connected in parallel with the series combination of the inductor 94 and the energizing circuit of the relay 95, the direct voltage of positive polarity obtained by the rectification being supplied through the resistor 106 to the control-grid of the pentode 93. Thus, in the normal operation conditions of the repeater station concerned, the voltage across the inductor 94 will be at a maximum, so that a maximum direct voltage occurs across the impedance 105, which results in a maximum anode current.

If the frequency produced by the measuring oscillator varies owing to the response of the relay circuit in the repeater station concerned, for example if an amplifying tube breaks down, this results in a decrease in anode current in the pentode 93, so that the relay 95 is de-energized and the alarm signal device 97 produces a continuous alarm signal (tube alarm). In the frequency indicator shown it may be examined by detuning the negative feed-back network 98, 103, whether the measuring frequency has decreased or increased. The decrease or the increase in measuring frequency is, as is set out with reference to Fig. 1, indicative of whether the deviation occurs in the amplifying stages for the outgoing traffic or the incoming traffic. The negative feed-back network is detuned by adjusting the capacitors 100, 101 and 102, which may be controlled simultaneously for example by means of a push button.

Deviations of the amplification of the amplifying stages for the outgoing and the incoming traffic are characterized, as stated above, by periodical interruptions of the measuring frequency in the rhythm of the frequency of one of the pilot alarm voltage generators. In the frequency indicator the relay 95 thus responds periodically, so that the alarm signal device 97 produces an intermittent alarm signal (pilot alarm), the periodicity of which (1 c./s. or 3 c./s.) indicates whether the disturbance occurs in the amplifying stages for the outgoing traffic or in those for the incoming traffic.

If in the repeater station concerned occur simultaneously a deviation from the anode current of the amplifying tube and a variation in amplification, the frequency indicator produces only a continuous alarm signal (tube alarm). By detuning the negative feed-back network the intermittent pilot alarm is produced.

Supply disturbances in the repeater station are characterized by the failure of the measuring frequency, or the intermittent interruption of the measuring frequency, so that a continuous or an intermittent alarm respectively is produced. Such disturbances may be distinguished immediately by means of the load meters 80 and 81.

Summarizing we may state that the frequency indicators 89, 90, 91 and 92 indicate the disturbed amplifying station and the position of the disturbance in this station (amplifying stages for the outgoing and the incoming traffic or else the supply apparatus).

Instead of using the frequency indicator of the kind described above, use may be made of other kinds of indicators, for example indicators comprising two delay circuits. The frequency indicator described above has the advantage that one relay and one alarm device suffice in this case.

What is claimed is:

1. A monitoring device for use in a carrier-wave telephone system having an incoming traffic amplifier and an outgoing traffic amplifier and power supply means connected to energize said amplifiers, comprising an oscillator capable of oscillating at different frequencies, a differential relay connected to selectively cause said oscillator to oscillate at said different frequencies and having an energizing circuit differentially connected between the connections of said amplifiers to said power supply means, and frequency indicator means connected to be responsive to different oscillation frequencies of said oscillator.

2. A monitoring device as claimed in claim 1, including two resistors interposed respectively in the connections of said amplifiers to said power supply means, and in which said energizing circuit comprises an energizing winding having ends connected to said power supply means through said resistors, respectively.

3. A monitoring device as claimed in claim 1, in which said differential relay comprises two terminal contacts and a switching contact responsive to said energizing circuit and arranged to selectively contact said terminal contacts, said oscillator comprising a frequency-determining circuit, and means respectively connecting said terminal contacts to different points on said frequency-determining circuit.

4. A monitoring device as claimed in claim 1, in which said frequency indicator means compises an amplifier provided with a frequency-dependent negative feedback circuit for feeding back only substantially all frequencies other than one of said oscillator frequencies, an alarm device, said amplifier including an output circuit connected to actuate said alarm device, rectifier means connected to rectify the output signals of said amplifier, and means connected to apply the output of said rectifier means to the input of said amplifier in a positive sense.

5. A monitoring device for use in a carrier-wave telephone system having an incoming traffic amplifier and an outgoing traffic amplifier and power supply means connected to energize said amplifiers, comprising an oscillator adapted to oscillate at different frequencies, a differential relay connected to selectively cause said oscillator to oscillate at said different frequencies and having an energizing circuit differentially connected between the connections of said amplifiers to said power supply means, frequency indicator means connected to be responsive to different oscillation frequencies of said oscillator, means connected to feed pilot signals into said amplifiers, a difference producer connected to receive said pilot signals from the outputs of said amplifiers and adapted to produce a difference signal in accordance with any difference in amplitudes of the amplified pilot signals, and a first pilot alarm voltage generator connected to be responsive to said difference signal when it exceeds a given threshold value and cause a periodical cut-off of said oscillator.

6. A monitoring device as claimed in claim 5, including a second pilot alarm voltage generator connected to be responsive to said difference signal when it exceeds a given threshold value in opposite polarity to the polarity to which said first pilot alarm voltage generator is responsive and cause a periodical cut-off of said oscillator with a different periodicity than that of said first pilot alarm voltage generator.

7. A monitoring device as claimed in claim 5, in which said oscillator and said difference producer each respectively comprise a thermionic tube having a heater element, and in which said power supply means comprises two independent sources of filament power connected respectively to said heater elements.

References Cited in the file of this patent

UNITED STATES PATENTS 2,300,415 Green ---------------- Nov. 3, 1942